(12) United States Patent
Aoki

(10) Patent No.: US 7,852,521 B2
(45) Date of Patent: Dec. 14, 2010

(54) RECORDING MEDIUM DETERMINATION APPARATUS AND IMAGE FORMING APPARATUS

(75) Inventor: Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 11/753,152

(22) Filed: May 24, 2007

(65) Prior Publication Data

US 2007/0279702 A1 Dec. 6, 2007

(30) Foreign Application Priority Data

Jun. 6, 2006 (JP) .............................. 2006-157663

(51) Int. Cl.
*H04N 1/04* (2006.01)
*G06K 9/40* (2006.01)

(52) U.S. Cl. ......................... 358/474; 382/263; 382/264

(58) Field of Classification Search ................. 347/122; 358/3.27, 500, 509, 510, 443, 448, 464, 469, 358/447, 474, 475, 3.07; 382/143, 151, 152, 382/263, 264, 274
See application file for complete search history.

(56) References Cited

U.S. PATENT DOCUMENTS

| | | | |
|---|---|---|---|
| 6,668,144 B2 | 12/2003 | Maruyama | |
| 7,715,739 B2 * | 5/2010 | Umeda et al. | 399/45 |
| 2003/0053076 A1 * | 3/2003 | Adachi | 356/512 |
| 2005/0264638 A1 * | 12/2005 | Umeda et al. | 347/122 |
| 2006/0290991 A1 * | 12/2006 | Gregoris | 358/3.07 |
| 2008/0146897 A1 * | 6/2008 | Alfano et al. | 600/310 |
| 2010/0039640 A1 * | 2/2010 | Colle | 356/239.4 |

FOREIGN PATENT DOCUMENTS

JP 2002-182518 6/2002

* cited by examiner

*Primary Examiner*—Jerome Grant, II
(74) *Attorney, Agent, or Firm*—Fitzpatrick, Cella, Harper & Scinto

(57) ABSTRACT

The image forming apparatus includes: a reflection LED for emitting light to a surface of a recording medium on which an image is not yet fixed; a transmission LED for emitting light to the back face of the surface of a recording medium on which an image is not yet fixed; a CMOS area sensor for reading, as image, a light irradiation region of the recording medium by the reflection LED or the transmission LED to output the image; and a condition setting mechanism for providing a control by which, in accordance with an output value from the CMOS sensor, a fixing processing condition of a fixing apparatus is set. The image forming apparatus transforms a waveform of the output from the CMOS area sensor to a frequency component to determine, based on the feature quantity of the frequency component, the type of the recording medium.

19 Claims, 11 Drawing Sheets

RECORDING MEDIUM DETERMINATION APPARATUS AND IMAGE FORMING APPARATUS

BACKGROUND OF THE INVENTION

1. Field of the Invention

The present invention relates to a recording medium determination apparatus and an image forming apparatus. In particular, the present invention relates to a recording medium determination apparatus that detects a surface smoothness of a recording medium to determine the recording medium and an image forming apparatus such as an ink jet printer, a copying machine, or a laser printer that controls image conditions to the determined recording medium.

2. Description of the Related Art

Conventionally, an image forming apparatus (e.g., copying machine, laser printer) includes: a latent image bearing member for supporting a latent image; a development apparatus for adding developer to the latent image bearing member to visualize a latent image as a developer image; and a transfer mechanism for transferring a developer image by the development apparatus onto a recording medium transferred in a specified direction. The image forming apparatus also includes a fixing apparatus that fixes a developer image on a recording medium by heating and pressurizing the recording medium on which the developer image is transferred by the transfer mechanism based on specified fixing processing conditions.

Conventionally, such an image forming apparatus has been structured as described below. When the size or type of a recording medium is set by a user through an operation panel or the like provided in the image forming apparatus body for example, a control is performed to change, depending on this setting, a development condition, a transfer condition, or a fixing processing condition or an image processing. It is noted that the type of a recording medium also may be hereinafter referred to as a paper type. Fixing processing condition includes, for example, a fixing temperature or a transport speed of a recording medium passing through the fixing apparatus. When a user sets a paper type for a printing operation through a host computer, the image forming apparatus performs a control to change, depending on the set paper type, a development condition, a transfer condition, a fixing processing condition, or an image processing.

The image forming apparatus forms a surface image of a recording medium by a complementary metal-oxide semiconductor (CMOS) sensor. A technique has been disclosed by Japanese Patent Laid-Open No. 2002-182518 for example. This technique introduces, with regards to the surface image, the maximum density pixel Dmax, the minimum density pixel Dmin, and a contrast that is a difference between Dmax and Dmin to use this contrast to determine the type of the recording medium. Depending on the type of the recording medium thus determined, the image forming apparatus subjects a development condition, a transfer condition, or a fixing condition to a variable control.

Another apparatus has been suggested in which a light-emitting source is provided at a position opposed to a sensor for determining a recording medium to detect transmitted light to determine a recording medium based on the transmitted light.

However, the above-described conventional recording medium determination apparatus, which calculates the surface smoothness based on the difference in contrast among pixels of an obtained image of the recording medium to determine the recording medium, may not accurately extract the feature of the recording medium to result in an erroneous determination. Furthermore, the conventional recording medium determination apparatus requires a long time for the determination (e.g., acquisition of a corrected image) in order to remove the light intensity variation of a light irradiation mechanism or noise in an obtained image. Thus, the conventional technique has left some problems unsolved.

SUMMARY OF THE INVENTION

The present invention has been made in view of the above problems. It is an objective of the invention to provide a recording medium determination apparatus that can provide an accurate recording medium determination while suppressing the determination time and an image forming apparatus that provides a favorable image by the recording medium determination apparatus.

In order to achieve the above objective, the recording medium determination apparatus of the present invention is characterized in including: a light irradiation unit for emitting light to a recording medium; an image reading unit that is irradiated by the light irradiation unit and that reads light from the recording medium as an image; and a transformation unit for transforming the image data read by the image reading unit to frequency component data, wherein the frequency component data is used to determine a surface condition of the recording medium.

In order to achieve the above objective, the recording medium determination apparatus of the present invention is characterized in including: a light irradiation unit for emitting light to a recording medium: an image reading unit that is irradiated by the light irradiation unit and that reads, as image data, light from the recording medium; and a calculation unit for subjecting the image data read by the image reading unit to a filter processing to calculate, based on the filter-processed data, contrast data, wherein the contrast data is used to determine a surface condition of the recording medium.

In order to achieve the above objective, the recording medium determination apparatus of the present invention is also characterized in including: a light-emitting element for emitting light to a recording medium; a sensor that is irradiated by the light-emitting element and that reads, as image data, light from the recording medium; and a transformation circuit for transforming the image data read by the sensor to frequency component data, wherein the frequency component data is used to determine a surface condition of the recording medium.

In order to achieve the above objective, the recording medium determination apparatus of the present invention is characterized in including: a light-emitting element for emitting light to a recording medium; a sensor that is irradiated by the light-emitting element and that reads light from the recording medium as image data; and a calculation circuit that subjects the vide data read by the sensor to a filter processing to calculate, based on the filter-processed data, contrast data; wherein the type of the recording medium is determined based on the contrast data.

In order to achieve the above objective, the recording medium determination apparatus of the present invention is characterized in including: a light-emitting element for emitting light to a recording medium; a sensor that is irradiated by the light-emitting element and that reads light from the recording medium as image data; and a transformation circuit that transforms the vide data read by the sensor to frequency component data, wherein the frequency component data is used to determine a basis weight of the recording medium.

In order to achieve the above objective, the image forming apparatus of the present invention is characterized in including: an image forming unit, including: a latent image bearing member for supporting a latent image; an exposure unit for forming, depending on image data, a latent image on the latent image bearing member; a development unit for visualizing the latent image formed on the latent image bearing member by developer; a transfer unit for transferring, onto a recording medium, the developer image visualized by the development unit; and a fixing unit for fixing the developer image on the recording medium, a light irradiation unit for emitting light to a recording medium; an image reading unit that is irradiated by the light irradiation unit and that reads, as image data, light from the recording medium; a transformation unit for transforming the image data read by the image reading unit to frequency component data; and a determination unit for determining, based on the frequency component data, the type of the recording medium, wherein depending on the type of the recording medium determined by the determination unit, a processing condition by the image forming unit is subjected to a variable control.

In order to achieve the above objective, the image forming apparatus of the present invention is characterized in including: an image forming unit, including: a latent image bearing member for supporting a latent image; an exposure unit for forming, depending on image data, a latent image on the latent image bearing member; a development unit for visualizing the latent image formed on the latent image bearing member by developer; a transfer unit for transferring, onto a recording medium, the developer image visualized by the development unit; and a fixing unit for fixing the developer image on the recording medium, a light irradiation unit for emitting light to a recording medium; an image reading unit that is irradiated by the light irradiation and that read, as vide data, light from the recording medium; a calculation circuit that subjects the image data read by the image reading unit to a filter processing to calculate, based on the filter-processed data, contrast data; and a determination unit that determines, based on the contrast data, the type of the recording medium, and depending on the type of the recording medium determined by the determination unit, a processing condition by the image forming unit is subjected to a variable control.

According to the present invention, a recording medium can be determined with a high accuracy with a reduced determination time. Thus, a favorable image can be obtained under various conditions.

Further features of the present invention will become apparent from the following description of exemplary embodiments (with reference to the attached drawings).

DESCRIPTION OF THE EMBODIMENTS

Figure 1:
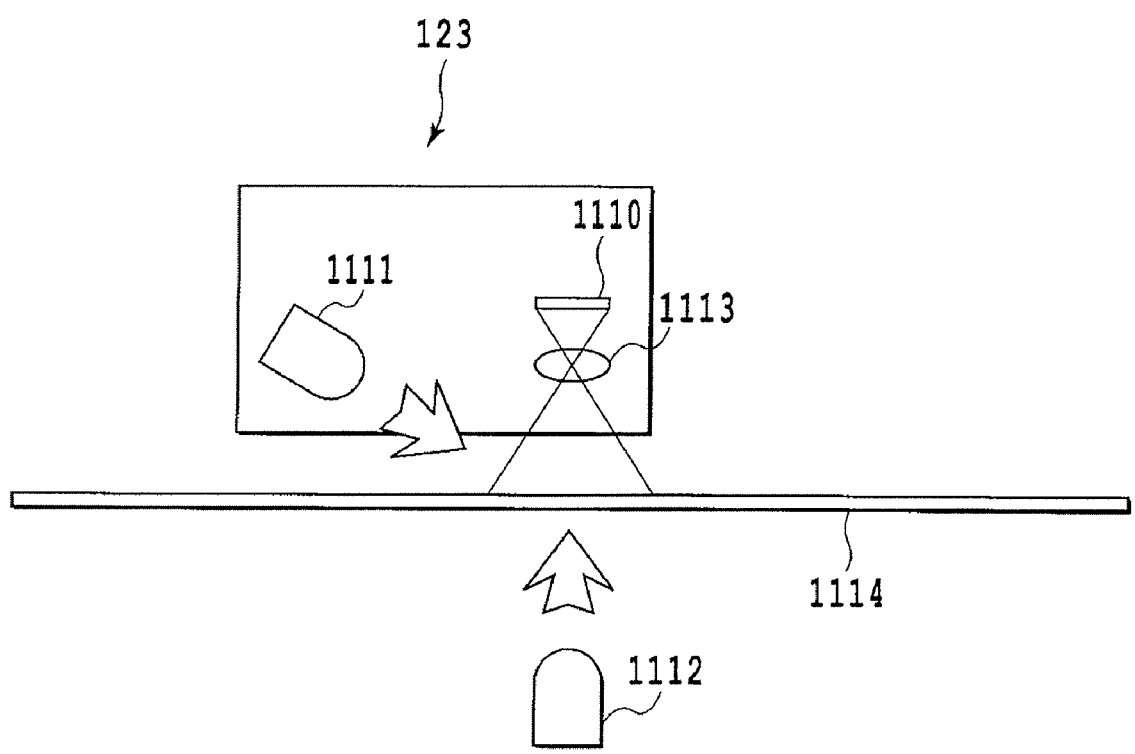
FIG. 1 is a schematic cross sectional view illustrating an image reading sensor of an embodiment to which the present invention can be applied.

Hereinafter, embodiments to which the present invention can be applied will be described with reference to the drawings. It is noted that components having the same functions are denoted with the same reference numerals in the drawings referred to in this specification.

Embodiment 1

Apparatus Structure

FIG. 1 is a schematic cross sectional view illustrating an image reading sensor that detects a surface smoothness and a the intensity of the reflection light or a transmission light amount of a recording medium and that is applied to a recording medium determination apparatus preferable for an image forming apparatus of Embodiment 1.

As shown in FIG. 1, an image reading sensor 123 has: a reflection LED 1111 that is the first light irradiation mechanism (light-emitting element); and a LED 1112 that is provided at an opposite position to a recording medium (print paper) 1114 and that detects a transmission light amount. The image reading sensor 123 also includes CMOS area sensor 1110 (which also may be a charge-coupled device (CCD) sensor or a photodiode sensor) as an image reading mechanism and a lens 1113 as an imaging lens.

Light from the reflection LED 1111 as a light source is emitted to the surface of the recording medium 1114. Reflected light from the recording medium 1114 is collected via the lens 1113 and is imaged by the CMOS area sensor 1110. In this manner, the surface image of the recording medium 1114 is read.

In Embodiment 1, the LED 1111 is arranged so that LED light has a specified angle to the surface of the recording medium 1114 as shown in FIG. 1 so that light can be emitted in an inclined manner.

Figure 2:
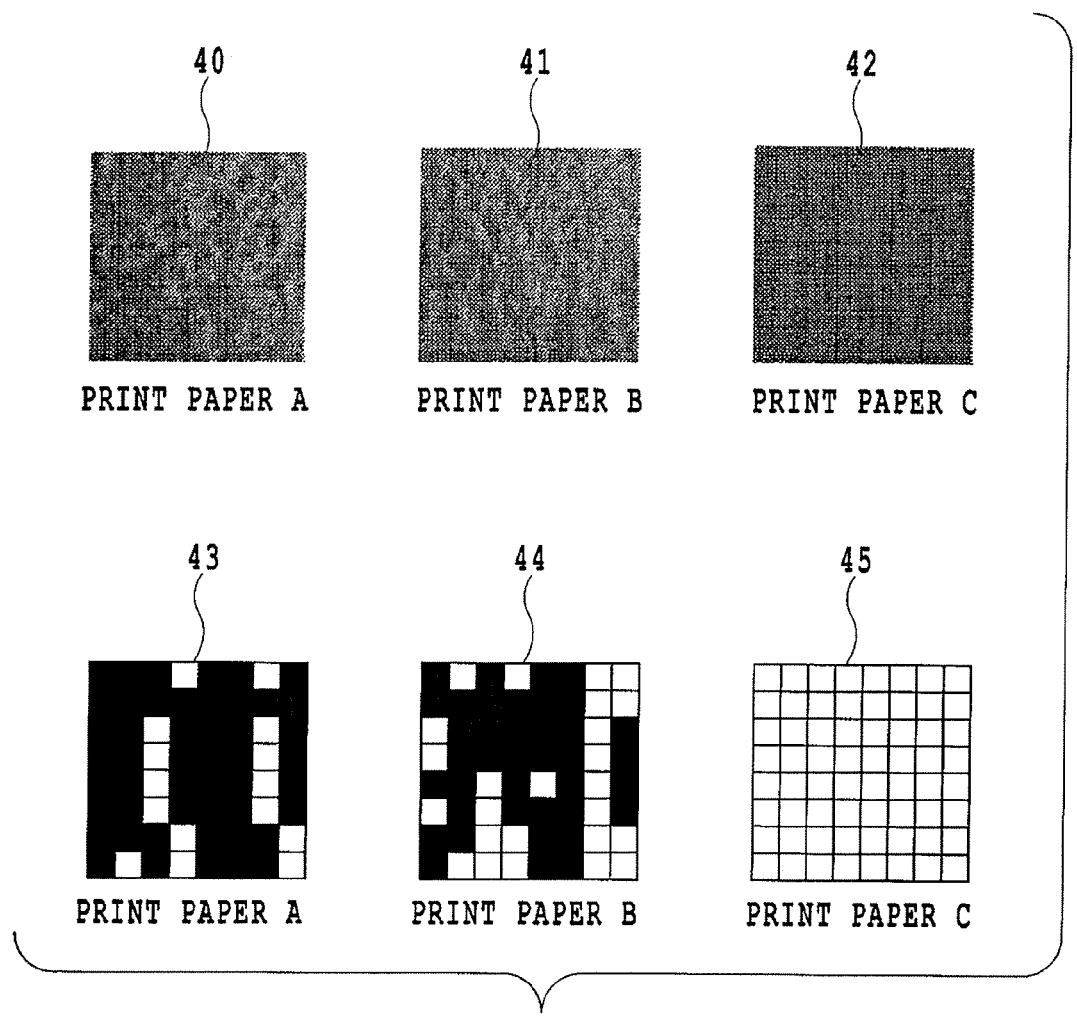
FIG. 2 illustrates an output of an image reading sensor of an embodiment to which the present invention can be applied.

FIG. 2 illustrates a relation between the surface of the recording medium 1114 read by the CMOS area sensor 1110 of the image reading sensor 123 and an output from the CMOS area sensor 1110 to a digital processing based on 8×8 pixels.

The above digital processing is performed by transforming an analog output from the CMOS area sensor 1110 to 8 bit pixel data by an analog/digital conversion mechanism (not shown).

In FIG. 2, the reference numeral 40 denotes an expanded image of a recording medium A of a-so-called rough paper for which the surface property is relatively rough and thus a concavities and convexities due to the fibers of the recording medium can be easily determined. The reference numeral 41 denotes an expanded image of a recording medium B of a so-called plain paper used in general offices. The reference numeral 42 denotes an expanded image of a recording medium C of a gloss paper used for a printing of a photograph in which paper fibers are sufficiently compressed for example.

These images 40 to 42 read by the CMOS sensor 1110 are subjected to a digital processing by the image reading sensor 123 to provide image data 43 to 45 shown in FIG. 2.

As described above, different types of print media have different surface images. These differences are caused mainly by the conditions of fibers in the surfaces of the papers.

During this digital processing, the image reading sensor 123 detects the intensity of the reflection light of the recording medium based on the total value or average value of light inputted to the respective pixels. The intensity of the reflection light of the recording medium is mainly determined depending on the whiteness level of the surface of a recording medium and is different depending on the type of the recording medium. As described above, based on the image of the recording medium of the surface read by the digital processing of the CMOS area sensor 1110, the surface condition of the paper fibers of the recording medium can be identified and the intensity of the reflection light can be calculated, thereby providing a more accurate determination of the recording medium.

Next, a method for measuring the permeability of the recording medium 1114 will be described. Light emitted from a transmission LED 1112 as a the second light irradiation mechanism is applied to the recording medium 1114 from the opposite side of the area sensor 1110 of the image reading sensor 123 to irradiate the reading area of the image reading sensor 123 on the recording medium.

Figure 3:
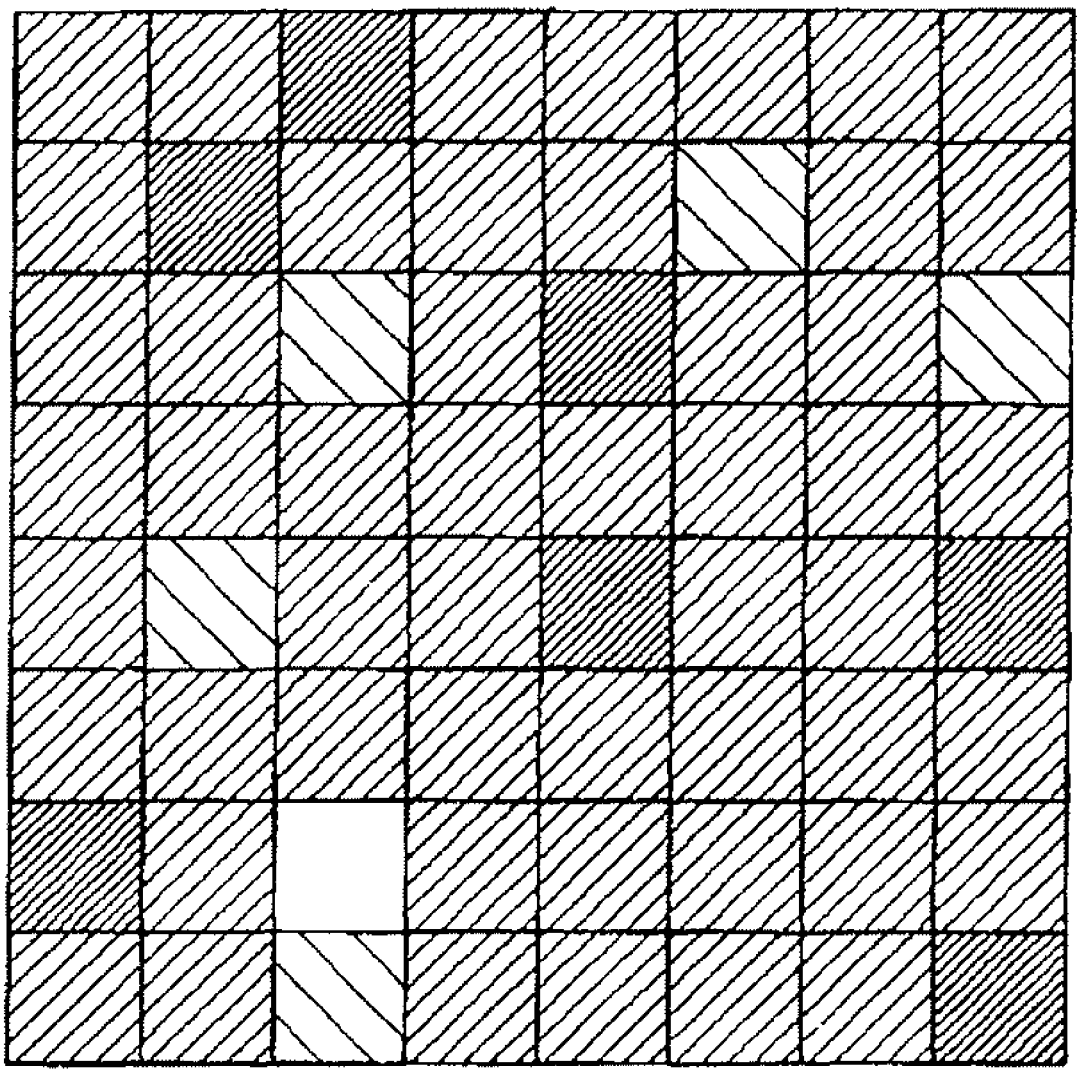
FIG. 3 illustrates an example of an output of a CMOS area sensor subjected to a digital processing of an embodiment to which the present invention can be applied.

FIG. 3 shows a relation between the surface of the recording medium 1114 read by the CMOS area sensor 1110 of the image reading sensor 123 through the use of the transmission LED 1112 and the 8×8 pixels obtained by the digital processing of the output from the CMOS area sensor 1110.

The transmitted light from the recording medium 1114 passes through the lens 1113 and is collected and is applied to the CMOS area sensor 1110. Then, the image reading sensor 123 determines an amount of the transmitted light based on the total value or the average value of light inputted to the respective pixels in the entire area or in a specified range of the sensor 1110. The image reading sensor 123 also may determine an amount of the transmitted light based the result of only one of a plurality of light-receiving pixels.

Figure 4:
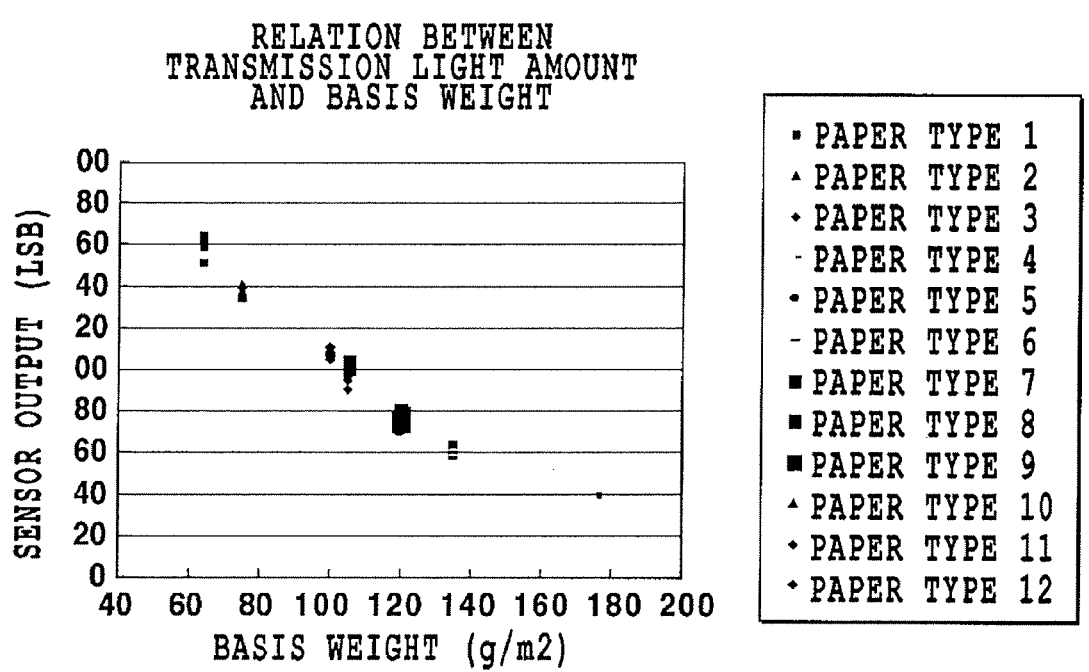
FIG. 4 illustrates a relation between an amount of transmitted light and a basis weight of an embodiment to which the present invention can be applied.

FIG. 4 illustrates a relation between a basis weight (weight of paper per 1 m²) and transmitted light. A recording medium having a high basis weight such as a thick paper for example has a small amount of transmitted light. A recording medium having a low basis weight such as a thin paper on the other hand has a large amount of transmitted light. This is mainly due to the difference in the condition of fibers in the paper surface and how fibers are compressed in the paper. Generally, a recording medium having an increased thickness has a higher basis weight while a recording medium having a reduced thickness has a smaller basis weight. Specifically, a relation of "basis weight of thick paper>basis weight of plain paper>basis weight of thin paper" is established.

Next, with reference to a block diagram of FIG. 5, a control circuit of the recording medium determination apparatus for controlling the CMOS area sensor 1110 that is preferred for the image forming apparatus of Embodiment 1 will be described.

Figure 5:
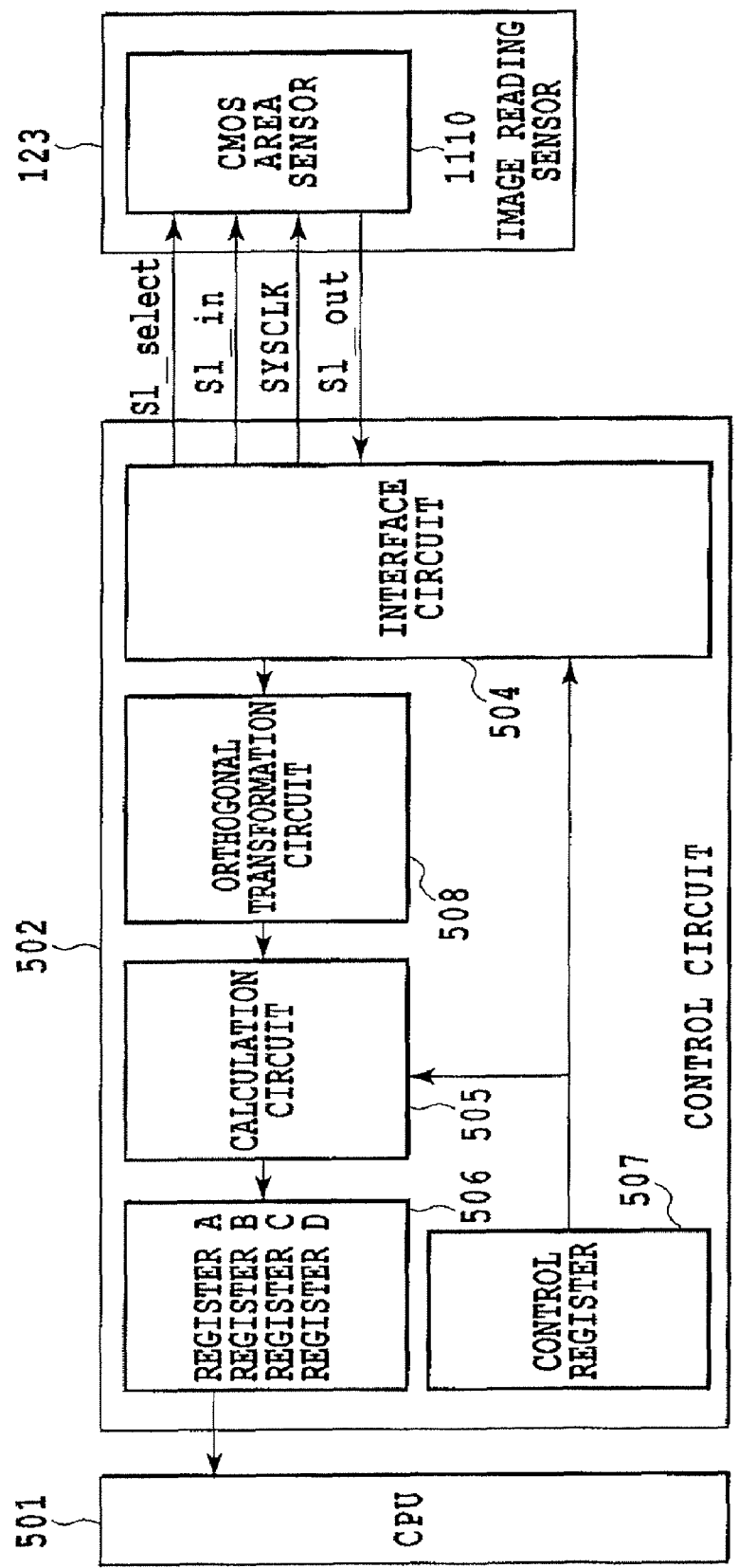
FIG. 5 is a block diagram illustrating a recording medium determination apparatus of an embodiment to which the present invention can be applied.

In FIG. 5, the reference numeral 501 denotes a determination section CPU, the reference numeral 502 denotes a control circuit, the reference numeral 1110 denotes a CMOS area sensor, the reference numeral 504 denotes an interface circuit, and the reference numeral 505 denotes a calculation circuit. The reference numeral 506 denotes a register (registers A to D) in which a calculation result of a recording medium surface is set, the reference numeral 507 denotes a control register, and the reference numeral 508 denotes an orthogonal transformation circuit.

An operation of the recording medium determination apparatus will be described. When the CPU 501 instructs the control register 507 to operate the CMOS area sensor 1110, the CMOS area sensor 1110 starts taking the image of a surface of a recording medium. Specifically, accumulation of charge in the CMOS area sensor is started.

The CPU 501 selects, via the interface circuit 504, the CMOS area sensor 1110 by SL_select to generate SYSCLK at a specified timing. Then, the CMOS area sensor 1110 transmits, via an SL_out signal, imaged digital image data.

The imaged data received via the interface circuit 504 is calculated by the control circuit 502 based on a calculation method (which will be described later). The calculation result is set in a register A506 as a space frequency of the recording medium surface. Based on the value of the resister A, the CPU 501 determines the surface smoothness of the recording medium.

The above-described CPU 501 is preferably a digital signal processor because the CPU 501 must subject, on a real-time basis, the image from the CMOS area sensor 1110 to a sampling processing, a gain and filter calculation processing.

Next, with reference to the block diagram of FIG. 6, the sensor circuit of the CMOS area sensor 1110 will be described.

(Description of Operation)

Figure 6:
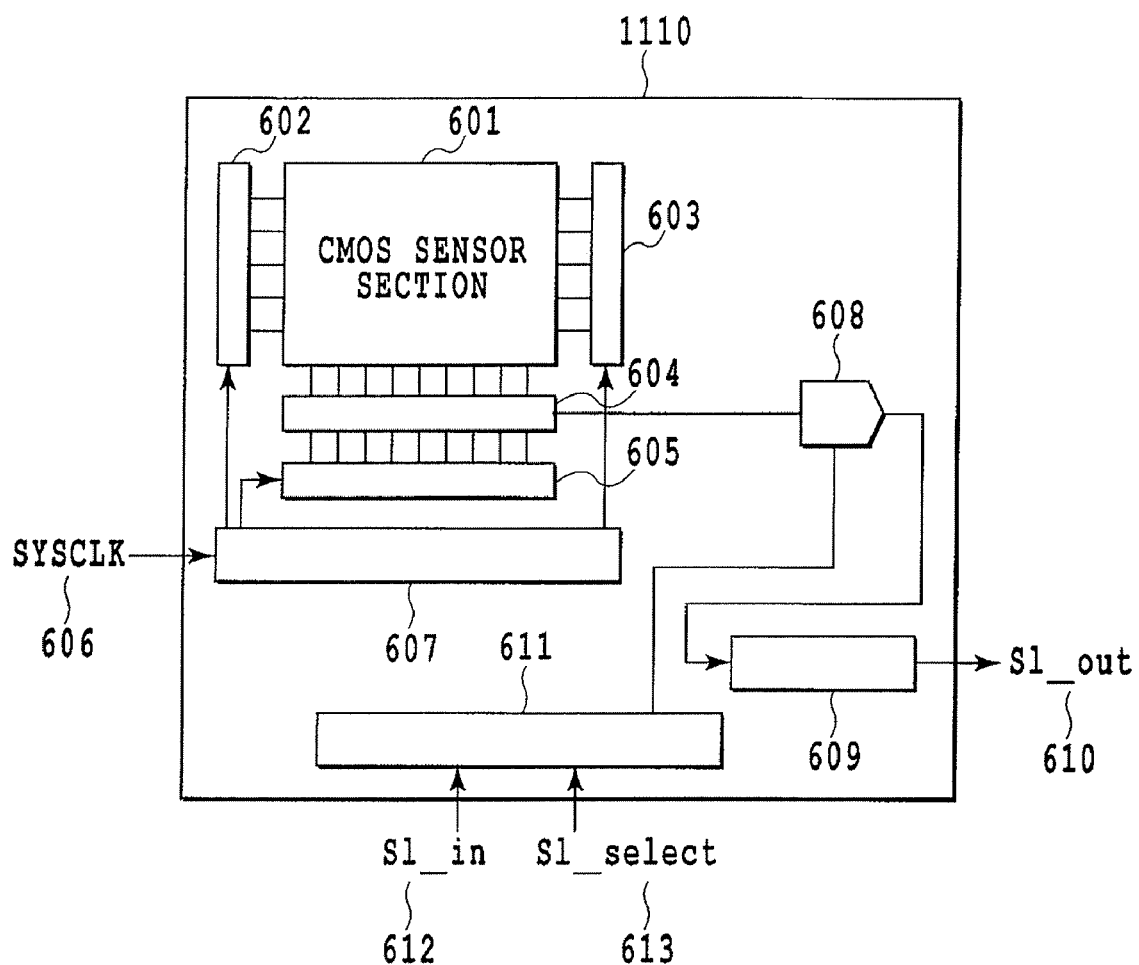
FIG. 6 is a block diagram of a circuit of a CMOS area sensor of an embodiment to which the present invention can be applied.

FIG. 6 is a block diagram illustrating the circuit of the CMOS area sensor. In FIG. 6, the reference numeral 601 denotes a CMOS sensor section in which a sensor of 8×8 pixels is provided in an area-like manner for example. The reference numerals 602 and 603 denotes a vertical direction shift register, the reference numeral 604 denotes an output buffer, the reference numeral 605 denotes a horizontal direction shift register, the reference numeral 606 denotes a system clock, and the reference numeral 607 denotes a timing generator.

An operation of the CMOS area sensor 1110 will be described. When the SL_select signal 613 is active, the CMOS sensor section 601 starts the accumulation of charge based on the received light. When the system clock 606 is given, the timing generator 607 causes the vertical direction shift registers 602 and 603 to sequentially select a to-be-read pixel column to sequentially set the data to the output buffer 604.

The data set in the output buffer 604 is transferred by the horizontal direction shift register 605 to an A/D converter 608. The pixel data obtained through the digital conversion of the A/D converter 608 is controlled by the output interface circuit 609 at a specified timing and is outputted to an SL_out signal 610 while the SL_select signal 613 being active.

On the other hand, the control circuit 611 can be used to use the Sl_in signal 612 to subject an A/D conversion gain of the A/D converter 608 to a variable control.

For example, when the contrast of the imaged image is not obtained, the CPU 501 can increase the contrast by increasing the A/D conversion gain of the A/D converter 608 so that the image can be always imaged with an optimal contract.

Figure 7:
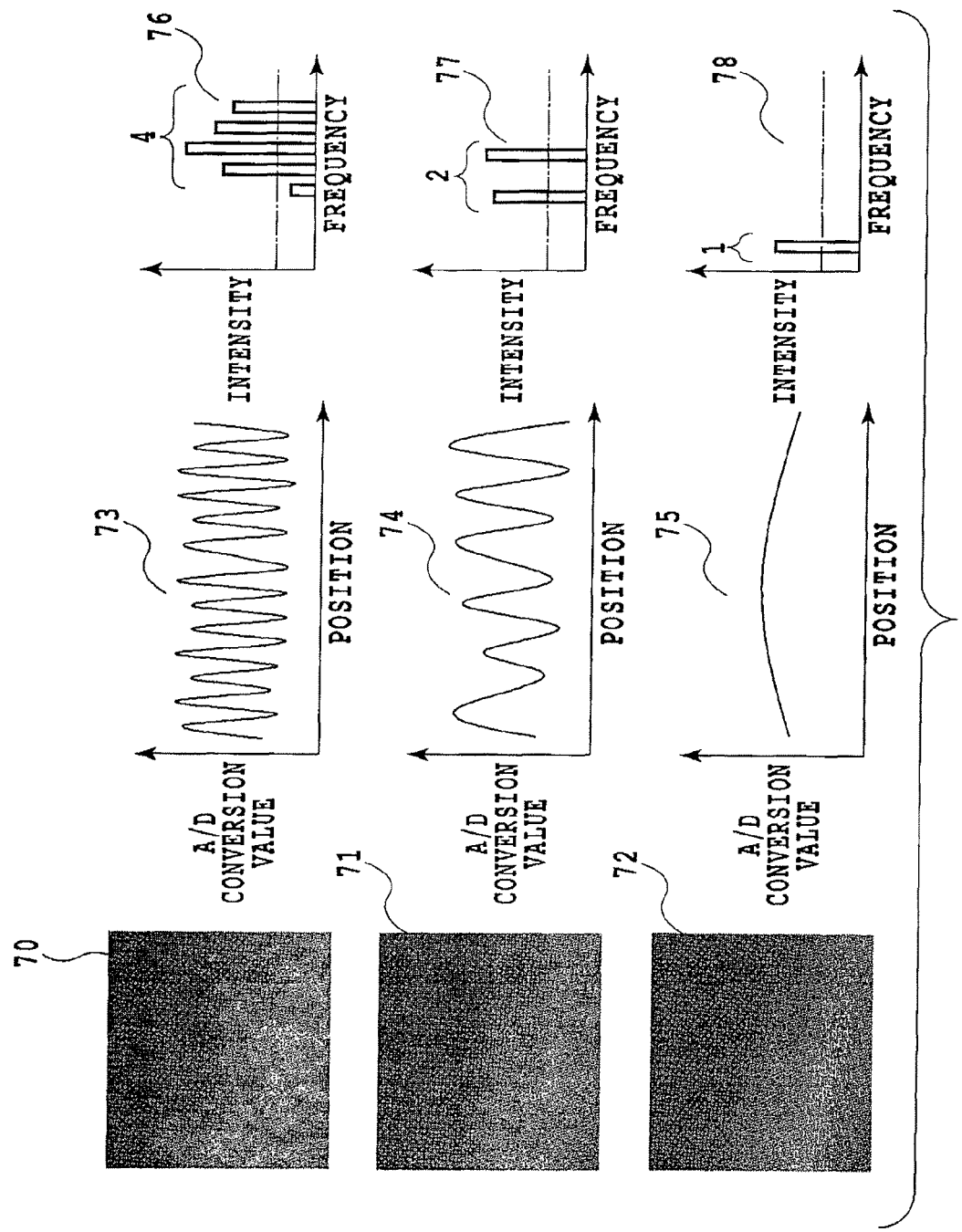
FIG. 7 illustrates a space frequency calculation method of an embodiment to which the present invention can be applied.

Next, with reference to FIG. 7, a method for calculating the space frequency of the recording medium surface will be described. In FIG. 7, images 70 to 72 are an image obtained by subjecting the image of a recording medium surface to a digital processing. The image 70 is an expanded image of a recording medium of a so-called rough paper that has a relatively rough surface (surface condition) for which the concavities and convexities by fibers of the recording medium can be easily determined. An image 71 is an expanded image of the surface of a so-called plain paper mainly used in general offices. An image 72 is an expanded image of the surface of a gloss paper that has paper fibers compressed sufficiently and that has fewer concavities and convexities then those of a plain paper.

Analog signals 73 to 75 outputted from the sensor section of the CMOS area sensor are subjected to an A/D conversion to provide 8 bit pixel data and the resultant 8 bit data in proportional with the brightness of the image is sent to the control circuit 502. The pixel data sent via the interface circuit 504 to the orthogonal transformation circuit 508 is subjected to a discrete Fourier transformation processing by the orthogonal transformation circuit 508. The discrete Fourier transformation processing is performed based on the following formula (1-1) to transform the pixel data to frequency component data 76 to 78.

$$X_s(k) = \sum_{n=0}^{N-1} x(n) e^{-j\frac{2\pi k n}{N}} \quad \text{Formula (1-1)}$$

In the formula, "N" denotes the total number of pixels of the CMOS area sensor 1110.

"X(n)" denotes the brightness of the nth pixel.

"k" represents a frequency.

The frequency component data is data obtained by resolving pixel data based on every frequency to represent the magnitude of the amplitude by a spectrum. This spectrum data represents the feature of the original image.

Specifically, in the case of the recording medium A having concavities and convexities of paper fibers at the surface, shadows of fibers having various thicknesses exist (image 70). Thus, various density variations are caused (analog signal 73), causing an increased number of spectrums (frequency component 76). In the case of the surface of the recording medium C, fewer shadows of fibers are caused (image 72). Thus, the density variation is mild (analog signal 75) and fewer spectrums are caused (frequency component 78). Although the details will be described later, based on this comparison, the CPU 501 determines the paper type (surface condition) of the recording medium.

Based on the formula (1-2), the calculation circuit 505 calculates spectrum amplitude $|C_n|$ for every frequency (which represents the feature of the original image) to count the number of frequencies having spectrum amplitude $|C_n|$ equal to or higher than a certain value to set the counted number F1 in a register A506. This certain value of the amplitude of the spectrum is a specified fixed value.

$$|C_n| = \sqrt{X_{sRe}(n)^2 + X_{sIm}(n)^2} \quad \text{Formula (1-2)}$$

In the formula (1-2), $X_{sRe}(n)$ and $X_{sIm}(n)$ represent a real part and an imaginary part of $X_s(n)$.

As described above, the total value of frequencies having values equal to or higher than a certain spectrum amplitude value is defined as a value F1 of the calculation result of the space frequency of the recording medium surface. It is noted that, although the above section has used a discrete Fourier transformation for the calculation of the spectrum amplitude value, a fast Fourier transformation based on a pixel number $2^n$ also may be used or another orthogonal transformation also may be used for transformation to frequency component data.

Next, a control flow by the CPU 501 to control the print condition of the image forming apparatus of Embodiment 1 will be described.

The CPU 501 obtains, from the register A506, a value F1 of the calculation result of the space frequency of the recording medium surface calculated by the calculation circuit 505 to compare the value F1 of the calculation result with a reference value stored in a memory (not shown). The memory is a read-only memory (ROM) or an Electronically Erasable and Programmable Read Only Memory (EEPROM) for example. By doing this, the CPU 501 determines the type of the recording medium. The term "reference value" herein means a threshold value used to determine whether the recording medium is a gloss film, a gloss paper, or a paper having low smoothness (e.g., plain paper). Thus, the type of a the recording medium is determined based on reference values R1 to R3 (R1<R2 (R3) in the manner as described below.

a) F1≦R1 Determination as a gloss film b) R1<F1≦R2 Determination as a gloss paper c) R2<F1≦R3 Determination as a plain paper d) R3<F1 Determination as a rough paper The CPU 501 sets an image forming condition optimal for the determined recording medium. The CPU 501 performs various controls of print conditions as described below.

When the recording medium is a gloss paper for example, the CPU 501 performs a control by which a different γ curve from that of a plain paper is specified and the color impression is changed. The reason is that a gloss paper is desirably printed with a high contrast on a recording medium.

The CPU 501 also provides a control by which a fixing temperature of a fixing unit is changed depending on the type of a supplied recording medium. In the case of a thick paper having thicker thickness than that of a plain paper, a thick paper has a higher heat capacity than that of a plain paper. Thus, a problem is caused in which, when a toner image is fixed on a thick paper with the same fixing temperature as that for a plain paper, the toner image has a poor fixing characteristic. Thus, when the CPU 501 determines that the recording medium is a thick paper, the CPU 501 provides a control by which a higher fixing temperature than that for a plain paper is used to secure a toner fixing characteristic to the thick paper.

The CPU 501 also provides a control by which, depending on the determined type of the supplied recording medium, the transport speed of a recording medium is changed. Specifically, in the case of a thick paper having thicker thickness than that of a plain paper, a thick paper has a higher heat capacity than that of a plain paper. Thus, a problem is caused in which, when a toner image is fixed on a thick paper with the same transport speed as that for a plain paper, the toner image has a poor fixing characteristic. Thus, when the CPU 501 determines that the recording medium is a thick paper, the CPU 501 sets the transport speed of the recording medium lower than that a transport speed of a plain paper so that heat quantity supplied to the thick paper per a unit time is increased.

Alternatively, a different fixing temperature also may be used to a recording medium having a basis weight; a control also may be provided by which a relatively high fixing temperature is provided to a recording medium having a relatively thick thickness for example because such a recording medium has high heat capacity; or a control also may be provided by which a relatively low fixing temperature is provided to a recording medium having a relatively thin thickness (i.e., small heat capacity). Alternatively, a control also may be provided by which a different recording medium transport speed is used depending on a basis weight of a recording medium.

In the case of an overhead transparencies (OHT) sheet or a gloss paper for example, a control also may be provided by which the sheet or paper is determined to increase the fixing characteristic of toner attached to the surface of a recording medium to improve the gloss to provide an improved image quality.

As described above, Embodiment 1 determines a recording medium by transforming image of the recording medium to frequency component data to calculate, based on the data, a space frequency value. The use of the frequency component data can extract the feature of fibers constituting the recording medium to provide a high determination accuracy.

Embodiment 2

Embodiment 2 basically has the same structure as that of Embodiment 1 except for a method for processing a signal of image of a surface of a recording medium. Thus, Embodiment 2 will not be described further with regards to the same structure.

Figure 8:
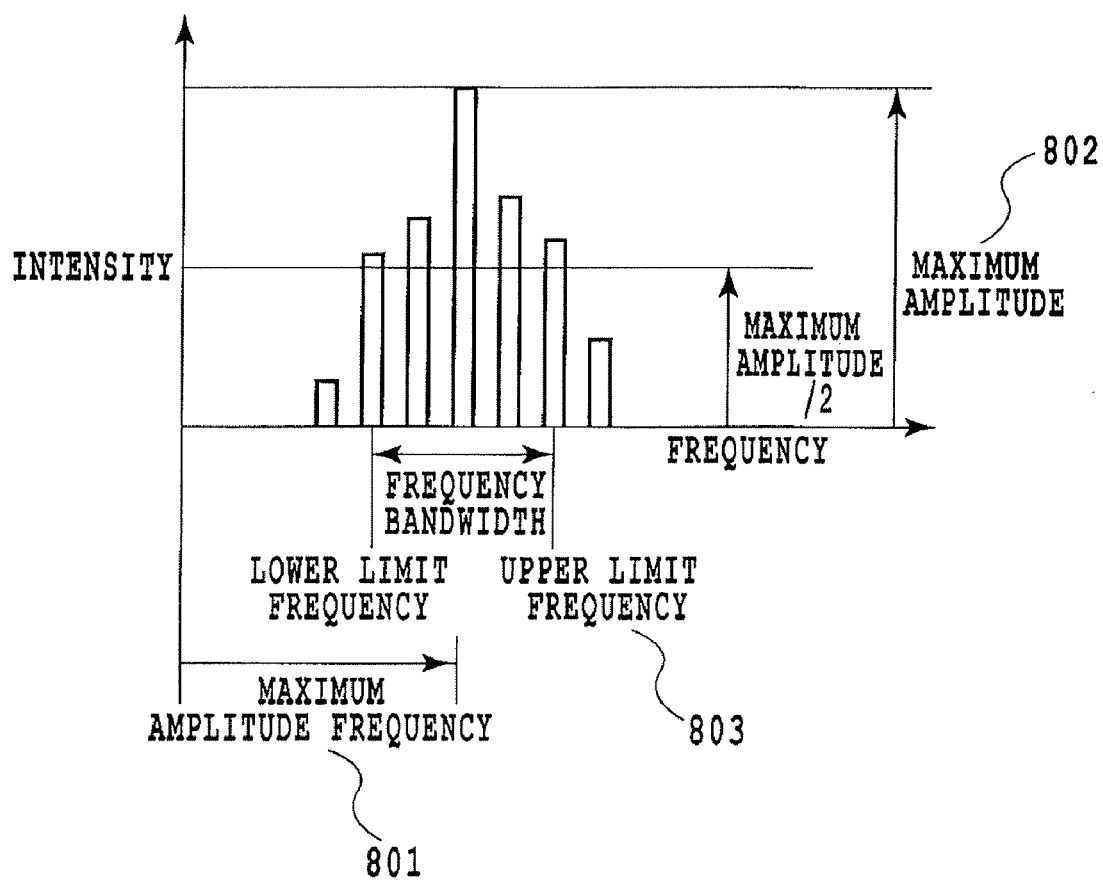
FIG. 8 illustrates a feature quantity calculated by a calculation circuit of an embodiment to which the present invention can be applied.

Based on the frequency component data obtained by the transformation by the orthogonal transformation circuit 508, various feature quantities are calculated by the calculation circuit 505. With reference to FIG. 8, a feature quantity calculated by the calculation circuit 505 will be described.

Based on the formula (1-2), the calculation circuit 505 calculates the spectrum amplitude $|C_n|$ for each frequency. The calculation circuit 505 calculates, from among all frequency spectrums, a frequency for which the spectrum amplitude $|C_n|$ is maximum to set, in the register B506, the frequency as a frequency 801 having the maximum amplitude. The calculation circuit 505 also sets, in a register C506, the spectrum amplitude $|C_n|$ of the frequency as the maximum amplitude value 802.

Next, the calculation circuit 505 calculates an upper limit frequency and a lower limit frequency at which the intensity of the maximum amplitude spectrum (the maximum amplitude value) is halved. Then, the calculation circuit 505 sets, in a register D506, the width of the upper limit frequency and the width of the lower limit frequency as a frequency bandwidth 803.

In the case of a rough paper, fibers constituting the rough paper are not uniform and concavities and convexities of fibers are easily determined. Such not uniform fibers cause various frequency components to increase a frequency bandwidth and also cause large concavities and convexities to cause the maximum amplitude frequency and the maximum amplitude spectrum to be high.

In the case of a plain paper, fibers constituting the plain paper are uniform but concavities and convexities of fibers are easily determined. Thus, frequency components of fibers are fixed to cause a smaller frequency bandwidth. The large concavities and convexities cause the maximum amplitude frequency and the maximum amplitude spectrum to be high.

In the case of a gloss paper in which fibers are compressed sufficiently, concavities and convexities of fibers are not determined and only the variation in the light intensity is photographed. A light intensity variation component does not include a plurality of frequency components and thus has a small frequency bandwidth. The failure to determine concavities and convexities causes the maximum amplitude frequency and the maximum amplitude spectrum to be lower.

The CPU 501 obtains, from the registers B506 to D506, the calculation values of a recording medium surface calculated by the calculation circuit 505 to compare the calculation values with reference values R4, R5, and R6 previously stored in a memory (not shown) (e.g., ROM, EEPROM), thereby determining the type of the recording medium.

a) R4<the maximum amplitude frequency (register B) R5<the maximum amplitude spectrum (register C) R6<frequency bandwidth (register D) Determination as a rough paper b) R4<the maximum amplitude frequency (register B) R5<the maximum amplitude spectrum (register C) R6>frequency bandwidth (register D) Determination as a plain paper c) R4>the maximum amplitude frequency (register B) R5>the maximum amplitude spectrum (register C) R6>frequency bandwidth (register D) Determination as a gloss paper The CPU 501 sets image forming conditions optimal for the determined recording medium. Although the above determination has used all of the maximum amplitude frequency, the maximum amplitude spectrum, and a frequency bandwidth, one of these values also may be used for the determination.

As described above, Embodiment 2 also can use, as in Embodiment 1, frequency component data to accurately extract the feature of fibers constituting the recording medium, thus providing high determination accuracy.

Embodiment 3

Embodiment 3 basically has the same structure as that of Embodiment 2 except for a method for processing a signal of image of a surface of a recording medium. Thus, Embodiment 3 will not be described further with regards to the same structure.

Image of a surface of a recording medium obtained by the image reading mechanism includes data for light intensity variation of the light irradiation mechanism. This light intensity variation causes an AC offset in a measurement value. Thus, this light intensity variation may have an influence on the determination by a conventional method for determining a recording medium according to which a surface smoothness is calculated based on a difference in density between pixels to cause a deteriorated determination performance.

Generally, the light intensity variation is caused by a not uniform pattern of light emitted from the light irradiation mechanism. Generally, light intensity draws a line that has a peak in the vicinity of the center of the optical axis and that lowers from the peak. The light intensity of image of a surface of a recording medium does not have a plurality of peaks. Thus, a light intensity variation component in frequency components is lower than a basic frequency f represented by the formula (2-1).

$$f = \frac{1}{nt} \qquad \text{Formula (2-1)}$$

In the formula (2-1), "n" represents the number of pixels in one line of the CMOS sensor 1110 and "t" represents a sampling cycle.

Thus, a variation component of light intensity of the light irradiation mechanism can be removed by subjecting image of a surface of a recording medium to a digital high pass processing using the basic frequency f as a cutoff frequency.

Embodiment 3 is different from Embodiment 1 in that orthogonal transformation circuit in the block diagram of Embodiment 1 is substituted by a digital filter circuit and the space frequency calculation circuit is substituted by a contrast calculation circuit.

Figure 9:
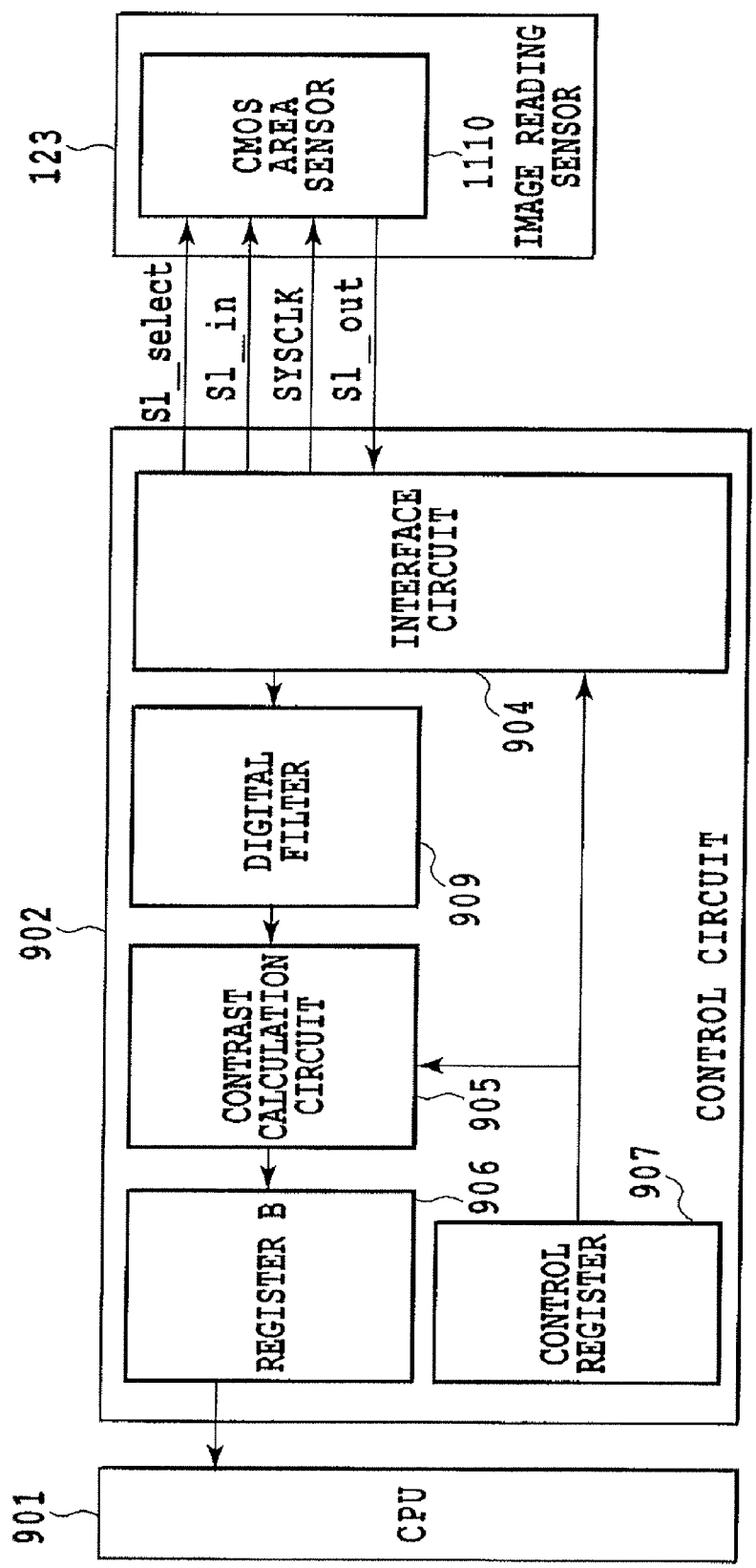
FIG. 9 is a block diagram of a recording medium determination apparatus of an embodiment to which the present invention can be applied.
Figure 10:
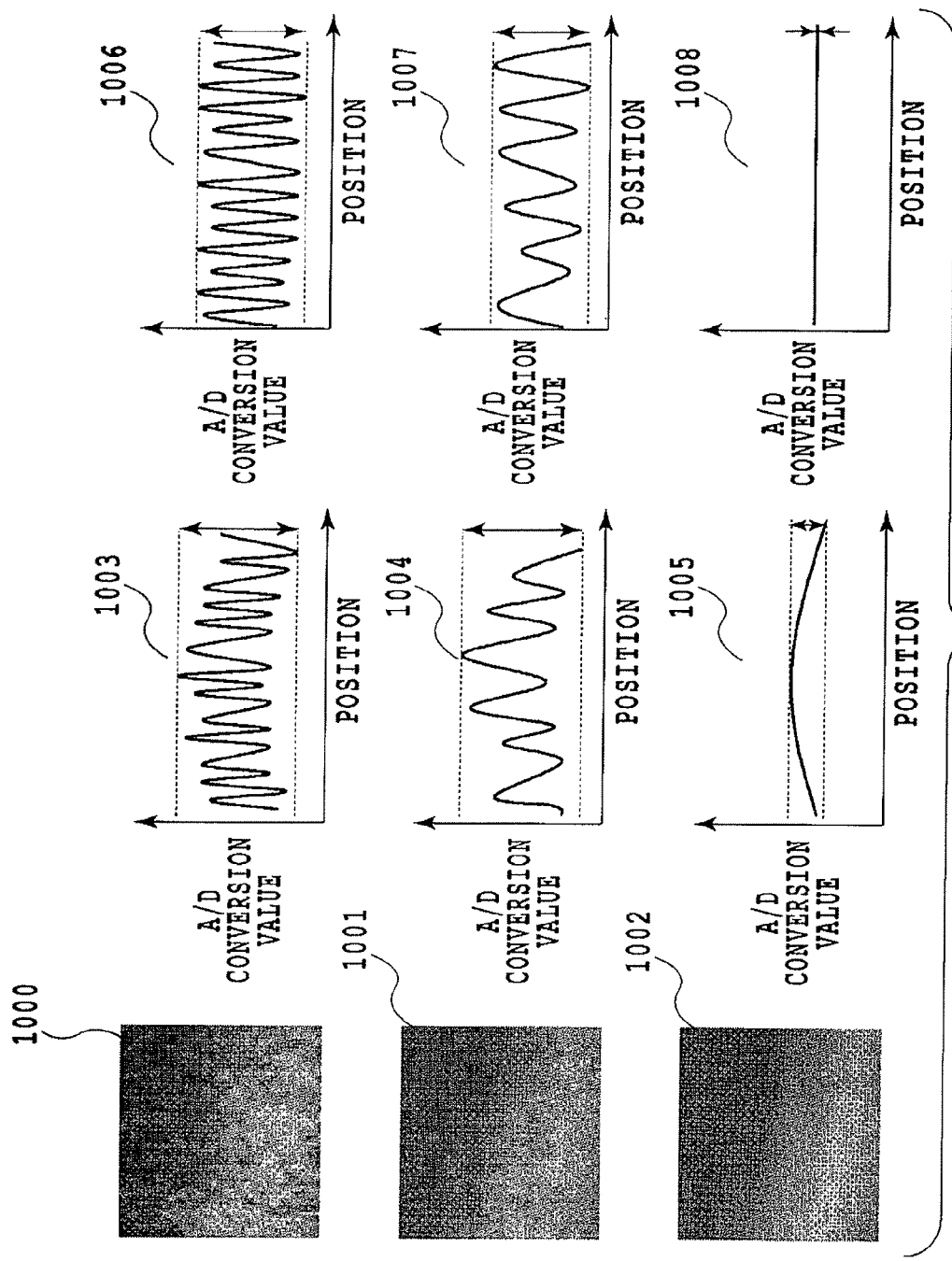
FIG. 10 illustrates a space frequency calculation method of a recording medium of an embodiment to which the present invention can be applied.

Next, with reference to FIG. 9 and FIG. 10, a mechanism for removing a variation component of light intensity will be described. In FIG. 10, images 1000 to 1002 are an image obtained by subjecting images of surfaces of print media A to C to a digital processing. The image 1000 is an expanded image of a surface of a so-called rough paper that has a relatively rough surface and that has concavities and convexities fibers for which the determination is easy. The image 1001 is an expanded image of a surface of a so-called plain paper mainly used in general offices. The image 1002 is an expanded image of a surface of a gloss paper in which paper fibers are sufficiently compressed.

Analog signals 1003 to 1005 outputted from the sensor section of the CMOS area sensor 1110 are subjected to a A/D conversion to provide 8 bit pixel data. Then, the data is sent, as 8 bit data in proportion with the brightness of the image, to a digital filter circuit 909 that uses a basic frequency f as a cutoff frequency. These analog signals 1003 to 1005 include AC components due to light intensity variation. Thus, it is difficult to determine the recording medium based on the contrast calculation result. The pixel data sent via the interface circuit 904 to the digital filter circuit 909 is subjected by the digital filter circuit 909 to a digital filter processing (also referred to as high pass filter processing) and then the resultant data is transformed to data 1006 to 1008. Based on contrast data calculated by contrast calculation circuit 905 based on the processed data, the CPU 901 calculates the surface smoothness to determine the recording medium. The processed data 1006 to 1008 do not include AC components due to light intensity variation and thus the recording medium can be determined accurately.

Although the above section has described that the recording medium determination mechanism after the removal of light intensity variation has compared the contrasts between pixels, the recording medium determination method as described in Embodiment 1 based on the calculation of a space frequency or another method also may be used.

In Embodiment 3 as described above, image of a surface of a recording medium is subjected to a digital filter processing using a basic frequency f as a cutoff frequency to obtain image data in which light intensity variation of a light irradiation mechanism is removed to determine a recording medium with a high accuracy.

Embodiment 4

Embodiment 4 basically has the same structure as that of Embodiment 3 except for a method that the digital filter circuit is substituted by a low-pass filter circuit. Thus, Embodiment 4 will not be described further with regards to the same structure.

Image of a surface of a recording medium obtained by the image reading mechanism includes data of noise in a CMOS sensor or an A/D converter. Noise data is also caused when strong reflection of light from the light irradiation mechanism by a cross section of a fiber constituting the recording medium. This noise causes a sudden change of a measurement value and thus has an adverse effect on the determination of a recording medium based on the calculation of a surface smoothness by calculating the difference in the contrast between pixels, thus causing a deteriorated determination performance.

Figure 11:
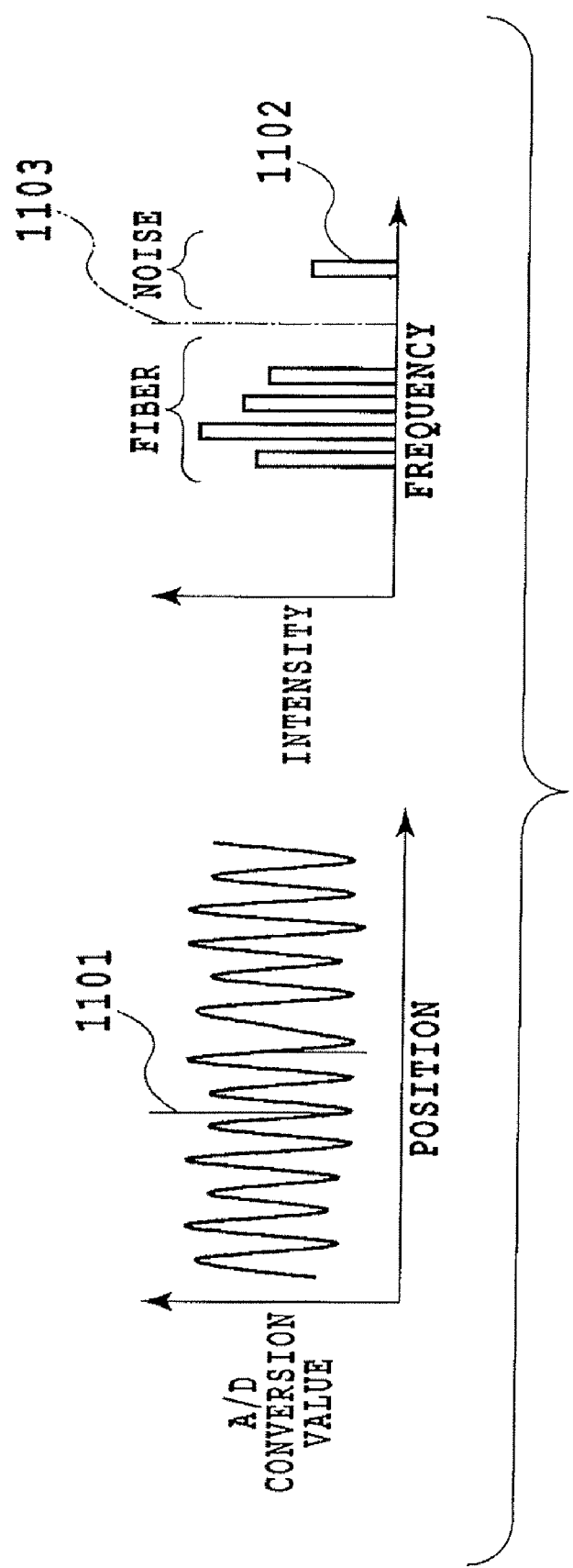
FIG. 11 illustrates a digital low-pass processing of an embodiment to which the present invention can be applied.

With reference to FIG. 11, Embodiment 4 will be described. Noise 1101 is generally represented by a sudden increase or decrease of data of a certain one pixel. Thus, a noise component 1102 in frequency components is higher than the maximum frequency f' (reference numeral 1103 in FIG. 11) caused by fibers of the recording medium.

Thus, the image of a surface of a recording medium can be subjected to a digital low-pass processing using the maximum frequency f as a cutoff frequency to remove the sudden noise component.

Although the above section has described the digital filter circuit 909 as the low-pass filter circuit, it is also possible to use a band-pass filter to simultaneously remove light intensity variation and noise.

Embodiment 4 as described above is characterized in that image of a surface of a recording medium is subjected to a digital low-pass filter processing based on the maximum frequency f' as a cutoff frequency to obtain image data from which sudden noise is removed so that the determination of the recording medium is performed with a high accuracy.

Embodiment 5

Structure of Image Forming Apparatus

As is clear to those skilled in the art, a conventional image forming apparatus (e.g., copying machine, laser printer) is composed of the following members.

A latent image bearing member for supporting a latent image;

An exposure mechanism for forming a latent image on a latent image bearing member by flickering light irradiation depending on the image data;

A development apparatus for visualizing a latent image as a developer image by adding developer to the latent image bearing member;

A transfer mechanism for transferring the developer image by the development apparatus onto a recording medium transported in a specified direction; and A fixing apparatus for subjecting the developer image on which the developer image was transferred by the transfer mechanism to heating and pressurization based on specified fixing processing conditions to fix the developer image on the recording medium.

Although the image forming apparatus as described above is well-known to those skilled in the art, the outline of the structure will be described. An image forming apparatus (not shown) preferred in Embodiments 1 to 4 as described above is disclosed in, for example, Japanese Patent Laid-Open No. 2002-182518. This disclosed image forming apparatus has: a paper cassette for storing papers; a paper feed roller for feeding papers; an image forming section for forming an image on a paper; a discharge roller for discharging a paper on which the image is formed; and a discharge tray for example. The image forming section has: a transfer belt driving roller; a transfer belt; a plurality of photoconductive drums as a latent image bearing member; a plurality of transfer rollers as a transfer mechanism; a plurality of cartridges; a plurality of optical units; and a fixing unit consisting of a fixing roller as a fixing apparatus and a pressurization roller for example.

Through the image forming apparatus as described above, an electronograph process is used to transfer, on a print paper as a recording medium, the respective toner images of yellow, magenta, cyan, and black in a superposed manner. Then, the print paper is heated and pressurized by the fixing roller of the fixing unit at a specified temperature to fix the toner image on the print paper.

An optical unit for each color is structured to expose and scan the surface of each photoconductive drum by a laser beam to form a latent image. Scanning operations in the series of image forming operations are controlled in a synchronized manner so that the image transfer is started at a specified position of the transported print paper. A latent image formed on the surface of each photoconductive drum is visualized as a toner image formed by toner as a developer of each color by the development apparatus provided in the cartridge.

The image forming apparatus also includes: a paper feed motor for feeding and transporting a print paper; a transfer belt driving motor for driving a transfer belt driving roller; a photoconductive drum driving motor for driving a photoconductive drum of each color and a transfer roller; and a fixing driving motor for driving the fixing roller.

The image forming apparatus of Embodiment 5 is obtained, for example, by combining the image forming apparatus disclosed in Japanese Patent Laid-Open No. 2002-182518 as described above with the recording medium determination apparatus of Embodiments 1 to 4. Thus, the structure of such a combination would be clear for those skilled in the art. The image forming apparatus of Embodiment 5 includes the above-described image reading sensor 123. The image reading sensor 123 emits light onto a surface or allows light to pass the surface, which the surface of a print paper sent from the paper cassette by the paper feed roller, to collect the reflected light or transmitted light for imaging to detect image of a specific area of the print paper.

As disclosed in Japanese Patent Laid-Open No. 2002-182518 for example, the image forming apparatus as described above subjects, depending on the determination result of the recording medium determination apparatus, the print processing conditions of the image processing, the exposure mechanism, the development apparatus, the transfer mechanism, or the fixing apparatus to a variable control. Thus, an image forming apparatus including the recording medium determination apparatus of this embodiment subjects, depending on various characteristics (e.g., surface property of a recording medium, thickness of a recording medium), an image processing, a development bias, a temperature control value of a fixing unit, or a recording medium transport speed to a variable control. By doing this, a stable image quality not depending on the recording medium can be obtained.

In addition to the embodiments as described above, the following embodiment also can be carried out.

(1) Although the above-described embodiment has described a case of an image forming apparatus such as a copying machine or a printer, the present invention is not limited to this. The invention also can be applied to an image reading apparatus as a complex machine or an image scanning apparatus only including an image scanner function for example.

(2) Although the above-described embodiment has described the determination of a surface condition of a recording medium, it is also possible to subject, to the methods of Embodiments 1 to 4, data obtained by reading the light passing through a recording medium described in Embodiment 1 by the image reading sensor to determine, based on the processing result, the basis weight (thickness) of the recording medium. In this case, a processing for transforming light quantity data of the respective pixels read by the image reading sensor to frequency component data by the orthogonal transformation circuit, a processing for subjecting the data to a processing by a digital filter circuit, or a processing for subjecting the data to a processing by a low-pass filter is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-157663, filed Jun. 6, 2006, which is hereby incorporated by reference herein in its entirety.

What is claimed is:

1. A recording medium determination apparatus, comprising:
   a light irradiation unit for emitting light to a recording medium;
   an image reading unit that is irradiated by the light irradiation unit and that reads light from the recording medium as an image data; and
   a transformation unit for transforming the image data read by the image reading unit to frequency component data which consists of spectrums by frequency,
   wherein the frequency component data is used to determine a surface condition of the recording medium.

2. The recording medium determination apparatus according to claim 1, wherein
   among the frequency component data, the number of spectrums having an amplitude value equal to or higher than a specified value is counted to compare the counted number with a threshold value to determine a surface condition of the recording medium.

3. The recording medium determination apparatus according to claim 1, wherein
   a surface condition of the recording medium is determined based on a frequency of a spectrum among the plurality of spectrums at which an amplitude value is maximum, the amplitude value of the spectrum, and a frequency bandwidth determined based on the frequency of the frequency component data and the maximum amplitude value.

4. The recording medium determination apparatus according to claim 1, wherein:
   the image reading unit reads, as image data, light reflected from the recording medium or light passing through the recording medium.

5. A recording medium determination apparatus, comprising:
   a light irradiation unit for emitting light to a recording medium:
   an image reading unit that is irradiated by the light irradiation unit and that reads, as image data, light from the recording medium; and
   a calculation unit for subjecting the image data read by the image reading unit to a filter processing to calculate, based on the filter-processed data, contrast data, the filter processing being a digital filter processing or a low-pass filter processing,
   wherein the contrast data is used to determine a surface condition of the recording medium.

6. A recording medium determination apparatus, comprising:
   a light-emitting element for emitting light to a recording medium;
   a sensor that is irradiated by the light-emitting element and that reads, as image data, light from the recording medium; and a transformation circuit for transforming the image data read by the sensor to frequency component data which consists of spectrums by frequency, wherein the frequency component data is used to determine a surface condition of the recording medium.

7. The recording medium determination apparatus according to claim 6, wherein among the frequency component data, the number of spectrums having an amplitude value equal to or higher than a specified value is counted to compare the counted value with a threshold value to determine a surface condition of the recording medium.

8. The recording medium determination apparatus according to claim 6, wherein a type of the recording medium is determined based on a frequency of a spectrum among the plurality of spectrums at which an amplitude value is maximum, the amplitude value of the spectrum, and a frequency bandwidth determined based on the frequency of the frequency component data and the maximum amplitude value.

9. The recording medium determination apparatus according to claim 6, wherein:

the sensor reads, as image data, light reflected from the recording medium or light passing through the recording medium.

10. A recording medium determination apparatus, comprising:

a light-emitting element for emitting light to a recording medium;

a sensor that is irradiated by the light-emitting element and that reads light from the recording medium as image data; and a calculation circuit that subjects the image data read by the sensor to a filter processing to calculate, based on the filter-processed data, contrast data, the filter processing being a digital filter processing or a low-pass filter processing, wherein the type of the recording medium is determined based on the contrast data.

11. An image forming apparatus, comprising:

an image forming unit, including:

a latent image bearing member for supporting a latent image;

an exposure unit for forming, depending on image data, a latent image on the latent image bearing member;

a development unit for visualizing the latent image formed on the latent image bearing member by developer;

a transfer unit for transferring, onto a recording medium, the developer image visualized by the development unit; and a fixing unit for fixing the developer image on the recording medium, a light irradiation unit for emitting light to a recording medium;

an image reading unit that is irradiated by the light irradiation unit and that reads, as image data, light from the recording medium;

a transformation unit for transforming the image data read by the image reading unit to frequency component data; and a determination unit for determining, based on the frequency component data, the type of the recording medium, wherein depending on the type of the recording medium determined by the determination unit, a processing condition by the image forming unit is subjected to a variable control.

12. The image forming apparatus according to claim 11, wherein:

the image reading unit reads, as image data, light reflected from the recording medium or light passing through the recording medium.

13. An image forming apparatus, comprising:

an image forming unit, including:

a latent image bearing member for supporting a latent image;

an exposure unit for forming, depending on image data, a latent image on the latent image bearing member;

a development unit for visualizing the latent image formed on the latent image bearing member by developer;

a transfer unit for transferring, onto a recording medium, the developer image visualized by the development unit; and a fixing unit for fixing the developer image on the recording medium, a light irradiation unit for emitting light to a recording medium;

an image reading unit that is irradiated by the light irradiation and that reads, as image data, light from the recording medium;

a calculation circuit that subjects the image data read by the image reading unit to a filter processing to calculate, based on the filter-processed data, contrast data; and a determination unit that determines, based on the contrast data, the type of the recording medium, and depending on the type of the recording medium determined by the determination unit, a processing condition by the image forming unit is subjected to a variable control.

14. The image forming apparatus according to claim 13, wherein:

the image reading unit reads, as image data, light reflected from the recording medium or light passing through the recording medium.

15. A recording medium determination apparatus, comprising:

a light-emitting element for emitting light to a recording medium;

a sensor that is irradiated by the light-emitting element and that reads light from the recording medium as image data; and a transformation circuit that transforms the image data read by the sensor to frequency component data which consists of spectrums by frequency, wherein the frequency component data is used to determine a basis weight of the recording medium.

16. A recording medium determination apparatus, comprising:

a light irradiation unit for emitting light to a recording medium;

an image reading unit that is irradiated by the light irradiation unit and that reads light from the recording medium as an image data; and a transformation unit for transforming the image data read by the image reading unit to frequency component data, wherein the frequency component data is data consisting of a plurality of spectrums, and wherein among the frequency component data, the number of spectrums having an amplitude value equal to or higher than a specified value is counted to compare the counted number with a threshold value to determine a surface condition of the recording medium.

17. A recording medium determination apparatus, comprising:
a light irradiation unit for emitting light to a recording medium;
an image reading unit that is irradiated by the light irradiation unit and that reads light from the recording medium as an image data; and
a transformation unit for transforming the image data read by the image reading unit to frequency component data,
wherein the frequency component data is data consisting of a plurality of spectrums, and
wherein a surface condition of the recording medium is determined based on a frequency of a spectrum among the plurality of spectrums at which an amplitude value is maximum, the amplitude value of the spectrum, and a frequency bandwidth determined based on the frequency of the frequency component data and the maximum amplitude value.

18. A recording medium determination apparatus, comprising:
a light-emitting element for emitting light to a recording medium;
a sensor that is irradiated by the light-emitting element and that reads, as image data, light from the recording medium; and
a transformation circuit for transforming the image data read by the sensor to frequency component data,
wherein the frequency component data is data consisting of a plurality of spectrums, and
wherein among the frequency component data, the number of spectrums having an amplitude value equal to or higher than a specified value is counted to compare the counted value with a threshold value to determine a surface condition of the recording medium.

19. A recording medium determination apparatus, comprising:
a light-emitting element for emitting light to a recording medium;
a sensor that is irradiated by the light-emitting element and that reads, as image data, light from the recording medium; and
a transformation circuit for transforming the image data read by the sensor to frequency component data,
wherein the frequency component data is data consisting of a plurality of spectrums, and
wherein a type of the recording medium is determined based on a frequency of a spectrum among the plurality of spectrums at which an amplitude value is maximum, the amplitude value of the spectrum, and a frequency bandwidth determined based on the frequency of the frequency component data and the maximum amplitude value.

* * * * *